United States Patent [19]
Carlson et al.
[11] 4,452,729
[45] Jun. 5, 1984

[54] VOLTAGE STABLE NONLINEAR RESISTOR CONTAINING MINOR AMOUNTS OF ALUMINUM AND BORON

[75] Inventors: William G. Carlson, Murrysville; Tapan K. Gupta, Monroeville, both of Pa.; Andrew S. Sweetana, Jr., Bloomington, Ind.

[73] Assignee: Westinghouse Electric Corp., Pittsburgh, Pa.

[21] Appl. No.: 439,016

[22] Filed: Nov. 3, 1982

[51] Int. Cl.³ .................................................. A01B 1/06
[52] U.S. Cl. .................................... 252/518; 252/519; 338/20; 338/21
[58] Field of Search .................. 252/518, 519; 338/20, 338/21, 307, 309, 313, 314, 308, 325, 328, 332

[56] References Cited

U.S. PATENT DOCUMENTS

| | | | |
|---|---|---|---|
| 3,663,458 | 5/1972 | Masuyama et al. | 252/518 |
| 4,094,061 | 6/1978 | Gupta et al. | 252/518 |
| 4,160,748 | 7/1979 | Yodogawa et al. | 252/518 |
| 4,338,223 | 7/1982 | Yokomizo et al. | 252/518 |

*Primary Examiner*—Josephine Barr
*Attorney, Agent, or Firm*—D. P. Cillo

[57] ABSTRACT

A sintered nonlinear resistor body, useful in gapless lightning arresters comprises a major amount of ZnO and additional metal oxides including at least $Al_2O_3$ and an amount of boron oxide of from about 0.005 mole % to about 0.25 mole %.

8 Claims, 2 Drawing Figures

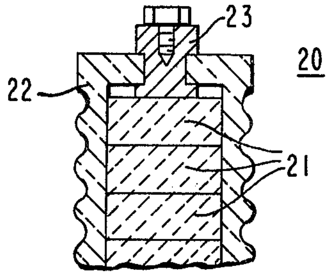
FIG. 1
FIG. 2
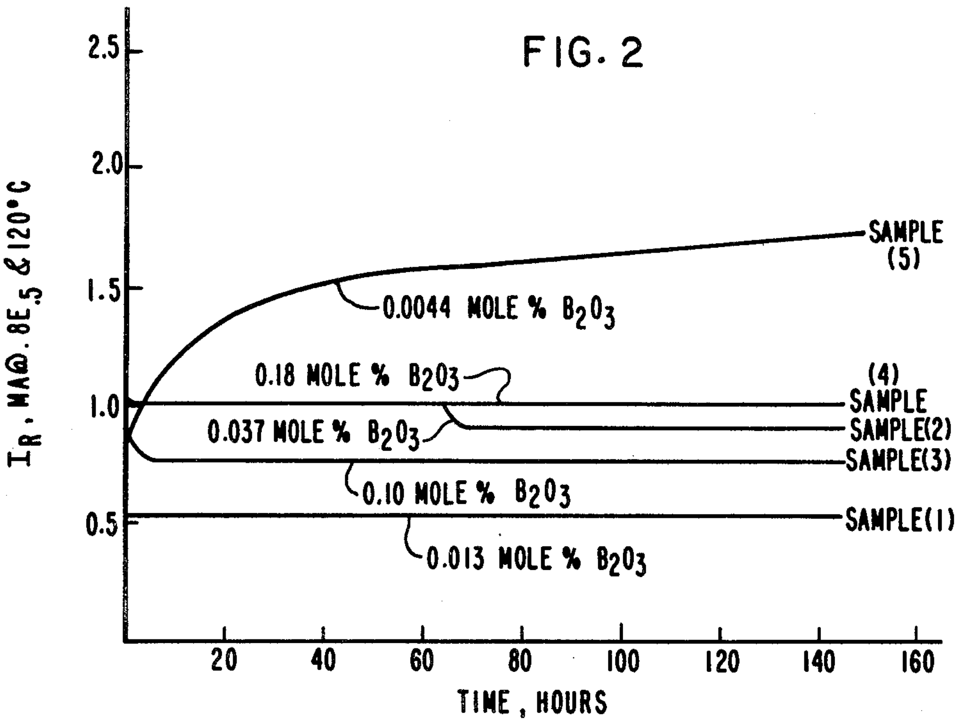

VOLTAGE STABLE NONLINEAR RESISTOR CONTAINING MINOR AMOUNTS OF ALUMINUM AND BORON

BACKGROUND OF THE INVENTION

Unwanted voltage surges have long been a critical problem to circuit designers of industrial and home electrical systems. Surges generated by load switching are often repetitive and range as high as 2,500 V. Lightning generated surges can range up to or over 50,000 V.

It is known that ZnO, when mixed with certain additives and sintered into pellets, can exhibit nonlinear V-I characteristics, as taught, for example, by Gupta et al., in U.S. Pat. No. 4,094,061. These modified ZnO compositions are candidate materials for nonlinear lightning arrester components and nonlinear resistor applications. Such devices can have nonlinearity, now generally believed to be due to an electrical barrier at the grain boundary between the grains of ZnO, i.e., completely due to electrical phenomenon within the bulk of the body.

The ZnO nonlinear devices have been made by mixing the additives with ZnO powder, and then pressing and sintering at appropriate pressures and temperatures, to form the resistor body. A wide variety of additives has been used. Gupta et al., for example, in U.S. Pat. No. 4,094,061, used 95 mole % ZnO, and 1 mole % each of $Bi_2O_3$, CoO, MnO, $Cr_2O_3$ and $Sb_2O_3$; while mentioning that other additives, such at $TiO_2$, $SnO_2$, $SiO_2$, $Al_2O_3$, $B_2O_3$, and at least a dozen others may also be used. The components were added to water with binder, spray dried, pressed, heated to decompose the binder, and then sintered to form the resistor body.

Other mixtures have omitted various additives, for example, Takatsuki et al., in U.S. Pat. No. 3,903,226, omitted certain additives, such as $Al_2O_3$ and $Co_3O_4$; using mixtures containing about 95 to 97 mole % ZnO, with possible minor amounts of other additives, such as 0.02 to 5.0 mole % $B_2O_3$. Similarly, Matsuura et at., in U.S. Pat. No. 3,863,193, omitted $Al_2O_3$ and $Co_3O_4$; using mixtures containing about 97 mole % ZnO, with possible minor amounts of additives, such as 0.01 to 5.0 mole % $B_2O_3$. Nagasawa et al., in U.S. Pat. No. 4,045,374, on the other hand, omitted $B_2O_3$; using mixtures of ZnO with minor amounts of additives such as $Al_2O_3$. Masuyama et al., in U.S. Pat. No. 3,663,458, taught use of $Al_2O_3$, and other additive oxides $B_2O_3$ in amounts of about 0.5 mole % each, in a mixture containing 80 to 99 mole % ZnO and up to 10 mole % $Bi_2O_3$.

Since 1976, attempts have been made to develop nonlinear resistors for high voltage-high energy absorption applications, such as series capacitor protectors and gapless lightning arresters. Standard nonlinear resistors exhibit marginal nonlinearity and voltage stability in these new high voltage-high energy applications.

Nonlinearity is a measure of ability to be near insulating at low voltage and conducting at high voltage. Stability is a measure of the ability of the resistor to retain its initial current-voltage characteristics after operating for a substantial period. If the stability is marginal, the resistive current will creep upward over a long time period resulting in excessive heat generation which would be detrimental to operation of these new high voltage-high energy devices.

Fishmen et al., in U.S. Pat. No. 3,928,245, addressed problems of stability in metal oxide voltage variable resistors. The improvement there, resulted from using a mixture of 96 mole % ZnO, 0.5 mole % $Bi_2O_3$, 0.5 mole % $MnO_2$, 1.0 mole % $Sb_2O_3$, 0.1 mole % $BaCO_3$, 0.1 mole % $B_2O_3$ and 0.25 mole % $SiO_2$, with omission of $Al_2O_3$ and $Co_3O_4$. This mixture was pressed into a flat disc, sintered, covered on both faces with a contact layer of silver and insulated about its perimeter to prevent flashover. One or more of these discs could be incorporated into a surge arrester assembly. While this mixture provided improved stability, even less of a percent change from initial current vs. time of operation is needed for modern high voltage-high energy devices.

SUMMARY OF THE INVENTION

The above needs have been met and the above problems solved by forming a sintered nonlinear resistor body from a major amount of ZnO, and additional metal oxides including at least an amount of aluminum oxide, i.e., $Al_2O_3$, of from about 0.002 to about 0.02 mole %, in combination with an amount of boron oxide, i.e., $B_2O_3$, of from about 0.005 to about 0.25 mole %, preferably an amount of $B_2O_3$ of from about 0.005 to about 0.02 mole %. The $Al_2O_3$ addition is essential to provide outstanding nonlinearity and the $B_2O_3$ addition is essential to provide outstanding stability.

One preferred embodiment of the sintered nonlinear resistor will contain about 96 mole % ZnO, 1.5 mole % $Bi_2O_3$, 1 mole % each of $Co_3O_4$, $MnO_2$, and $Sb_2O_3$, with approximately 0.3 mole % $SiO_2$, 0.005 mole % $Al_2O_3$, and ;b 0.013 mole % $B_2O_3$.

The components needed to provide the above sintered oxide nonlinear resistor are ground, mixed with binder and water, spray dried, and then pressed and sintered to form the resistor body. The resistor body faces are lapped to ensure flat and parallel surfaces and then covered with a suitable electrode material, such as zinc. Tests showed that the rate of change of resistive current with time for the above described resistor body was essentially eliminated and a flat resistive current ($I_R$) vs. time curve resulted. Nonlinearity ($\alpha$) was also outstanding, indicating usefulness in high voltage-high energy absorption applications, particularly in gapless lightning arresters.

BRIEF DESCRIPTION OF THE DRAWINGS

For a better understanding of the invention, reference may be made to the preferred embodiments, exemplary of the invention, shown in the accompanying drawings, in which:

FIG. 1 is a cross-sectional view through one embodiment of a high voltage, gapless lightning arrester; and FIG. 2 is a graph of resistive current ($I_R$) in mA vs time in hrs. for the sintered nonlinear resistor body of this invention.

DESCRIPTION OF THE PREFERRED EMBODIMENTS

Referring now to FIG. 1 of the drawings, one embodiment of a high voltage, gapless lightning arrester 20 is shown. The arrester comprises as a characteristic element, at least one voltage-nonlinear surge protective resistor body as a lightning arrester component 21, enveloped in a porcelain insulator 22 with associated line terminal 23. As can be seen, no gap exists between the plurality of components 21 shown. The components 21 are lapped at opposite end surfaces and provided with electrodes disposed between the plurality of components 21, the electrode end of one component electrically contacting the electrode end of the adjacent component, with no gaps between them.

According to this invention, there is provided a homogeneous, sintered nonlinear bulk-type resistor body, useful as a voltage nonlinear resistor, comprising a major amount of ZnO, and additional metal oxides including at least an amount of aluminum oxide, i.e., $Al_2O_3$, of from about 0.002 to about 0.02 mole %, in combination with an amount of boron oxide, i.e., $B_2O_3$, of from about 0.005 to about 0.25 mole %, preferably an amount of boron oxide of from about 0.005 to about 0.02 mole %. ZnO is preferably present in the range of about 90 to 97 mole % and $Bi_2O_3$ is preferably present in the range of from about 0.5 to 3 mole %. Other oxides present can include $Co_3O_4$, $MnO_2$, and $Sb_2O_3$, preferably present in the range of from about ;b 0.5 to 1.5 mole %, and $SiO_2$, preferably present in the range of from about 0.1 to 0.8 mole %. Minor amounts of other oxides may also prove useful.

Over about 0.25 mole % boron oxide in the resistor; the resistive current ($I_R$) will be higher, generating heat which could be detrimental, especially to high voltage, gapless, lightning arresters. Over about 0.02 mole % boron oxide in the resistor may create a substantial increase in the maximum value of initial and long term resistive current ($I_R$) vs. time. With under about 0.005 mole % boron oxide in the resistor, the voltage stability will not be enhanced,. With under about 0.002 mole % aluminum oxide, the nonlinear characteristic is substantially reduced. With over about 0.02 mole % aluminum oxide, the voltage stability will be decreased.

Thus, while both boron oxide and aluminum oxide are essential components of the sintered resistor, they provide opposite effects and must be balanced within a critical range in order for the positive effects of their combination to provide a dramatic increase in both nonlinearity and voltage stability.

The component materials are all added as metal oxides except for boron, which was added as boracic acid, $H_3BO_3$, dissolved in water. Upon sintering, the $H_3BO_3$ will decompose, forming an oxide of boron. While some reaction products may be formed during sintering, there should be little deviation in the amount of sintered material from the initial mole % values of the materials added as oxides, except for $Bi_2O_3$ which is considerably volatile at higher temperatures and up to 80% or more of $Bi_2O_3$ can be lost during sintering, depending on the process temperature and time. Other solvents for $H_3BO_3$ can be used, and other boron compounds may also be used, providing they do not result in an overly volatile material. The aluminum addition may also be in the form of a soluble salt such as $Al(NO_3)_3$, which will decompose upon heating to form $Al_2O_3$.

The ZnO, $Al_2O_3$ and the $H_3BO_3$ solution are mixed with the other oxides described hereinabove, in the ranges set forth, in a suitable mixing means such as a ball mill, along with water and a suitable binder. The resultant water-based slurry is then spray dried to evaporate the water and uniformly distribute the components and form a mass of agglomerated particles. Other means of evaporating water and agglomerating the components can also be used. The dry, agglomerated material is next poured as a free flowing powder into a suitable die. It is then pressed to form a flat, thin disc-shaped body having sufficient "green strength" to be handled in a commercial processing operation prior to sintering.

The pressed body is then subjected to a two staged heating process, first to decompose and eliminate the fugitive binder, and then to sinter the body to form a solid body having a substantially uniform density throughout the mass. The method of making these resistor bodies, along with useful particle sizes of the starting materials, useful binders, mixing and spray-drying procedures, pressing pressures, and heating and sintering temperatures, temperature rate increases and times are all well known in the art and described in complete detail in U.S. Pat. No. 4,094,061, herein incorporated by reference.

After sintering, the circular face of each resistor body is lapped, by any suitable means, to ensure flat and parallel surfaces. After lapping, the resistor body is provided with an electrode material surface on both circular, flat faces, by flame spraying or other suitable technique. Useful electrode layers include zinc, silver, aluminum and the like.

In the sintered body, the sintered polycrystalline ZnO grains will be coated and bound with the second phase additives. These additives are effective to produce electrical nonlinearity completely within the bulk of the body. The voltage limiting characteristic of these surge protective materials is believed due to the character of the grain boundary within the bulk or body of the material, which is near insulating at low voltage and conducting at high voltage. Thus, on impressing a voltage, the resistance changes from a nearly linear function of I (current) and V (voltage) - Ohm's Law, to a power function of $I \sim V^{\alpha}$, where $\alpha$, the nonohmic exponent, is a measure of the nonlinearity, and has a value greater than one. The final product of this invention will exhibit a high degree of nonlinearity with an $\alpha$ greater than about 26, when subjected to a voltage surge, when calculated over a current density range of 0.0005 to 200 A/sq.cm.

Presently preferred illustrative embodiments of the invention are as follows:

EXAMPLE 1

Sintered, nonlinear resistor bodies were made containing about 96 mole % ZnO, 1.5 mole % $Bi_2O_3$, 1 mole % $Co_3O_4$, 1 mole % $MnO_2$, 1 mole % $Sb_2O_3$, 0.30 mole % $SiO_2$, 0.005 mole % $Al_2O_3$, and 0.013 mole % $B_2O_3$ added initially as $H_3BO_3$ dissolved in water.

The $Al_2O_3$ powder initially added was a very fine particle size, 99.99% $Al_2O_3$. The $Bi_2O_3$ powder initially added was technical grade and all the other oxide powders initially added were reagent grade.

Compositions were prepared by first grinding the $Bi_2O_3$, $Sb_2O_3$, $Co_3O_4$, $MnO_2$, $SiO_2$ and $Al_2O_3$ in a small rubber-lined ball mill for 8 hours. The ground oxides were then transferred to a larger rubber-lined ball mill where ZnO, binders, water, and boron as $H_3BO_3$ dissolved in water were added, and the constituents mixed for 2 hours.

The resultant water-based slurry was then spray dried to simultaneously dry, mix, and agglomerate the slurry to form a mass of agglomerated particles. The spray-dried powder was then poured into a steel die. Test samples approximately 6 cm. in diameter and 1 cm. thick were pressed at about 5,000 psi. to give a pressed density of approximately 2.8 g./cu.cm. After pressing, the "green" body was two-stage heated, in a positive air flow, to initially decompose and eliminate the fugitive binder and then to sinter the body to form a solid sintered oxide body having a substantially uniform density throughout, as described in U.S. Pat. No. 4,094,061.

The sintered body was then allowed to slowly cool to 25° C. After sintering, the body has shrunk to provide test samples approximately 5 cm. in diameter and 0.70 cm. thick. The circular faces of the test samples were then lapped to ensure flat and parallel surfaces. After lapping, the samples were post heat treated for a short period at over 500° C. in a positive air flow. Electodes were formed on both flat circular surfaces with flame-sprayed Zn metal powder. Electrical tests were then run on the test samples.

Voltage stability for test purposes was defined as the stability of electrical characteristics to a continuous voltage stress of at least 80% of the nonlinear resistor (varistor) turn-on voltage termed $E_{.5}$, the voltage at 0.5 mA/sq.cm., and an elevated temperature of 40° C. A reasonable estimate of the voltage stability of the nonlinear resistors produced as described above was obtained by testing the nonlinear resistor at a substantially higher elevated temperature of 120° C. with an applied 60 Hz peak voltage of $0.8E_{.5}$ and monitoring the change in resistive current ($I_R$) over a 160 hr. time period.

The degree of nonlinear resistor stability ($I_R$) is greatly affected by both temperature and voltage; therefore, accelerated life tests can be obtained by testing at high temperature and higher-than-rated voltages, and measuring the change in resistive current. Nonlinear resistors which exhibit negligible changes in $I_R$ when tested under these conditions for periods greater than 100 hours, would then be considered to a highly stable.

The magnitude of $I_R$ is of import since this directly affects the thermal stability of the device and, therefore, determines the magnitude of the voltage that can be safely applied to the nonlinear resistor during its estimated lifetime. Means for either reducing the rate of change of resistive current with time to a very low value or preferably for eliminating the change completely is highly desirous for high longevity lightning arresters.

High current density data were obtained using a surge generator capable of attaining current densities of about 1,000 A/sq.cm. with a shaped current wave of $8\times20$ $\mu$-seconds. Data were obtained at various current densities using a dual beam oscilloscope to record the current-time and voltage-time data. The $E_{.5}$ value of each sample was measured after surging, to monitor $E_{.5}$ change with surging and to use in the calculation of the nonlinear exponent, $\alpha$, over the current density range of 0.0005 to 200 A/sq.cm.

Results of these tests for this Sample (1), containing 0.005 mole % $Al_2O_3$ and 0.013 mole % $B_2O_3$ is shown in FIG. 2 of the drawings and in TABLE 1 below. The criteria for selection of a superior nonlinear resistor composition was defined as:

(1) Voltage Stability at 120° C. and $0.8E_{0.5}$=a flat response of resistive current ($I_R$) with time at less than about 1.0 mA., and (2) Nonlinearity, $\alpha$=27 or greater measured from 0.0005 to 200 A/sq.cm.

EXAMPLE 2

Sintered, non-linear resistor bodies were made in exactly the same manner as in EXAMPLE 1, using the same process and amounts of ingredients, except that the mole % of $B_2O_3$ contained in the resistor body, was varied from 0.0044 mole % $B_2O_3$ to 0.18 mole % $B_2O_3$:0.013 mole % $B_2O_3$ —Sample (1); 0.037 mole % $B_2O_3$—Sample (2); 0.10 mole % $B_2O_3$—Sample (3); 0.18 mole % $B_2O_3$—Sample (4); and 0.0044 mole % $B_2O_3$—Comparative Sample (5).

Electrical tests were run on the Samples as described in EXAMPLE 1 and the results are shown in FIG. 2 of the drawings and in TABLE 1:

TABLE 1

| Sample | Mole % $B_2O_3$ | Mole % $Al_2O_3$ | Nonlinearity ($\alpha$) |
|---|---|---|---|
| (1) | 0.013 | 0.005 | 27 |
| (2) | 0.037 | 0.005 | 28 |
| (3) | 0.10 | 0.005 | 28 |
| (4) | 0.18 | 0.005 | 29 |
| *(5) | 0.0044 | 0.005 | 26 |

*Comparative Sample

As can be seen from the graphs of FIG. 2 and the results of TABLE 1, a $B_2O_3$ concentration of 0.013 mole % provides outstanding voltage stability at a low $I_R$ value coupled with very good nonlinearity. $B_2O_3$ concentrations of 0.037 mole %, 0.10 mole % and 0.18 mole % provide outstanding nonlinearity and very good voltage stability but at a higher $I_R$ value than Sample (1) at 0.013 mole % $B_2O_3$. Sample (5) at 0.0044 mole % $B_2O_3$ provided marginal to below-standard nonlinearity and poor voltage stability with a rising rather than a flat curve at a much higher $I_R$ value than either of the Samples (1) to (4).

We claim:

1. A sintered high voltage resistor which can exhibit long lasting nonlinear V-I characteristics, consisting essentially of at least about 90 mole % of ZnO and up to about 10 mole % of additional metal oxides effective to provide electrical nonlinearity within the resistor, and including the combination of from about 0.002 mole % to about 0.02 mole % of aluminum oxide and from about 0.005 mole % to about 0.25 mole % boron oxide as essential ingredients.

2. The sintered nonlinear resistor of claim 1, where the amount of boron oxide present is from about 0.005 mole % to about 0.02 mole %, ZnO is present from about 90 mole % to about 97 mole %, the additional metal oxides are effective to provide electrical nonlinearity completely within the bulk of the resistor and are selected from the group consisting of $Bi_2O_3$, $Co_3O_4$, $MnO_2$, $Sb_2O_3$, and $SiO_2$, and mixtures thereof, where the resistor is characterized as having the ability to retain its initial nonlinear V-I characteristics and its initial resistive current values during extended use.

3. A plurality of the sintered nonlinear resistors of claim 1, where the resistors have flat parallel surfaces with electrodes applied to said surfaces, said resistors being enveloped in an insulator with their electrode surfaces contacting each other without gaps therebetween, to provide a gapless lightning arrester.

4. A sintered high voltage, bulk-type resistor which can exhibit long lasting nonlinear V-I characteristics, consisting essentially of at least about 90 mole % of ZnO and up to about 10 mole % of additional metal oxides selected from the group consisting of $Bi_2O_3$, $Co_3O_4$, $MnO_2$, $Sb_2O_3$, and $SiO_2$ and mixtures thereof, and including the combination of from about 0.002 mole % to about 0.02 mole % of $Al_2O_3$ and from about 0.005 mole % to about 0.25 mole % of $B_2O_3$ as essential ingredients.

5. The sintered nonlinear resistor of claim 4, where the amount of $B_2O_3$ present is from about 0.005 mole % to about 0.02 mole %, ZnO is present from about 90 mole % to about 97 mole %, and where the resistor is characterized as having the ability to retain its initial nonlinear V-I characteristics and its initial resistive current values during extended use.

6. The sintered nonlinear resistor of claim 4, where the amount of $Bi_2O_3$ present is from about 0.5 mole % to about 3 mole %, the amount each of $Co_3O_4$, $MnO_2$ and $Sb_2O_3$ present is from about 0.5 mole % to about 1.5 mole % and the amount of $SiO_2$ present is from about 0.1 mole % to about 0.8 mole %.

7. The sintered nonlinear resistor of claim 4 having flat parallel surfaces with electrodes applied to said surfaces.

8. A plurality of the sintered nonlinear resistor bodies of claim 4 where the resistors have flat parallel surfaces with electrodes applied to said surfaces, said resistors being enveloped in an insulator with their electrode surfaces contacting each other without gaps therebetween, to provide a gapless lightning arrester.

* * * * *